Nov. 24, 1959     E. J. DRENNAN     2,913,824
METHOD AND APPARATUS FOR GAUGING HEADLIGHT ALIGNMENT
Filed April 5, 1954
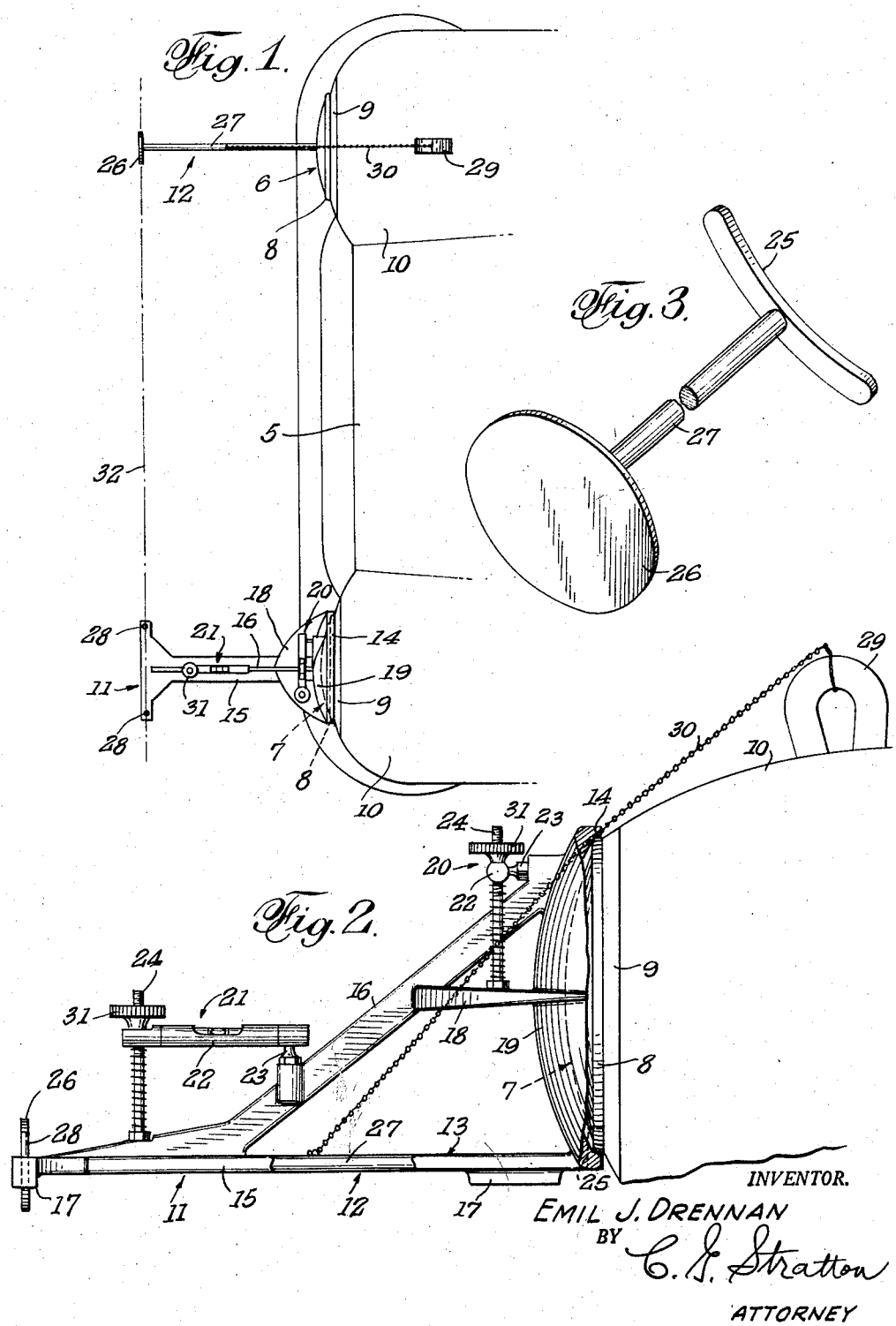
INVENTOR.
EMIL J. DRENNAN
BY
ATTORNEY

United States Patent Office 2,913,824
Patented Nov. 24, 1959

2,913,824

METHOD AND APPARATUS FOR GAUGING HEADLIGHT ALIGNMENT

Emil J. Drennan, Compton, Calif.

Application April 5, 1954, Serial No. 421,025

6 Claims. (Cl. 33—46)

This invention relates to a method and apparatus for gauging the mutual alignment and the alignment on a vehicle of a pair of headlights. The present apparatus is particularly adapted for use in gauging the alignment of sealed-beam headlamps.

Gauging or testing the adjustment of headlight beams usually entails projection of the beams upon a screen or wall and measuring the height thereof from the floor or other base line. A prerequisite of such procedure is that the vehicle having said lamps be level. This requirement dictates that beam testing operations can be properly carried out only where test has shown that the floor is truly level.

Since the direction of the beam is the result of the adjusted position of the headlamp, it is an object of the present invention to provide a novel method and means for gauging the lateral and vertical positions of the headlamps with respect to the vehicle and regardless of any slope there may be in the floor on which the vehicle rests, and also mutually gauging the two headlamps so that relative adjustment thereof may be made.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a top plan view of the forward end of an automotive vehicle and showing the present headlamp gauging apparatus applied to the headlamps of said vehicle.

Fig. 2 is an enlarged side elevational view as seen from the bottom of Fig. 1.

Fig. 3 is a further enlarged broken perspective view of a portion of said apparatus.

The drawing shows an automotive vehicle 5 having two headlamps 6 and 7 which are exactly alike. The headlamps shown are of the sealed-beam type and, therefore, each has an encircling bezel 8 that protrudes from a metal enclosing ring 9 that is in snap retention in an opening in fender 10. Removal of rings 9 affords access to adjusting screws that are provided for adjusting the lamps 6 and 7 both in a vertical and a horizontal plane. The foregoing describes a typical headlight installation for automotive vehicles. The present apparatus is provided for testing said headlights as to their position so that the mentioned adjusting screws may be manipulated to make any corrections in position if the same are indicated.

The present apparatus comprises two separate and structurally different tools, units or components 11 and 12 that are applied to the two headlamps 6 and 7 and mutually used to gauge said headlamps.

The unit 11 comprises a frame 13 that includes a rim or flange 14 adapted to be placed against and fit around bezel 8 of a headlamp, a forwardly directed base plate 15 extending from the lower portion of said flange 14, and a diagonal brace 16 interconnecting said plate and flange. Said base plate is provided with spaced foot pads 17 on which the unit 11 is adapted to be supported, said pads being normal to the plane of flange 14. Transverse ribs 18 integrally connect brace 16 and a convex closure wall 19 for flange 14 to impart rigidity to frame 13.

The frame thus provided mounts two spirit level means 20 and 21 transverse to each other. Level means 20 is disposed in a horizontal plane parallel to the plane of flange 14 and transverse to the longitudinal extent of base plate 15. Level means 21 is also horizontally disposed and is transverse to level means 20.

Each level means comprises a spirit level unit 22 mounted, at one end, at a point of pivot or fulcrum 23 on frame 13 and, at the other end, on an adjusting screw 24.

The unit or component 12 comprises an elongated device having an arcuate end yoke part 25 at one end, a disc or target 26 in a plane parallel to the plane of end part 25 at the other end, and a connecting stem 27. The curvature of part 25 is such as to fit and conform to the curvature of headlamp bezel 8. The length of stem 27 is such that when said part 25 is fitted against the periphery of one lamp bezel, the edge of disc 26 will align with two transversely spaced pins or other indicators 28 on the projecting end of base plate 15, when the component or unit 11 is placed with its flange or rim 14 around the bezel of the other headlamp.

The unit 12 is held in the mentioned position as by a magnet 29 that magnetically engages the fender 10 above the headlamp, a chain or the like 30 connecting said magnet and an intermediate part of stem 27. Since arcuate part 25 is fitted to the under portion of the lamp bezel 8 and rests thereagainst, said magnet and the part 25 combine to hold the stem forwardly projected, as in Fig. 1.

In practicing the present method, the unit 11 is placed with its pads 17 resting on the floor immediately adjacent to the floor on which rests the vehicle, the lamps 6 and 7 of which are to be tested or gauged. Thus, regardless whether or not the vehicle is truly horizontal, the unit 11 is disposed at whatever angle the vehicle is disposed. Of course, the unit is positioned lengthwise to the length of the vehicle.

By manipulation of nuts 31 of screws 24, the two levels 21 and 22 are set to zero. That is, their bubbles are brought to level-indicating positions.

Now, the unit 11 is placed with its rim or flange 14 over the bezel 8 of headlamp 7, as shown in Fig. 1, with plate 15 extending forwardly. Said unit is held in place by hand and is rotated until level 20 reads zero. The level 21 is then inspected. If the bubble thereof is in zero position, the headlamp 7 is properly positioned. If the bubble is at one end or the other of the unit 22 of level 21, then, by removing ring 9 and adjusting the screw that gives headlamp adjustment in a vertical plane, the bubble is brought to zero—an indication that the headlamp has been adjusted to proper position in a vertical plane.

Now, the unit 12 is placed in position with respect to headlamp 6, as shown in Fig. 1, with arcuate yoke 25 against the bottom of bezel 8 and magnet 29 engaged with fender 10 to hold stem 27 horizontal.

After tool 12 has thus been mounted, the tool 11 is replaced as before and a sight taken along line 32. If pins 28 and disc 26 all line up, then lateral adjustment of headlamp 7 is unnecessary. If adjustment is needed, the screw provided for lateral adjustment of the headlamp is manipulated to bring said pins 28 and disc 26 on the line 32.

Thereafter, the foregoing steps are repeated except that tool 11 is used in connection with headlamp 6 and tool 12 in connection with headlamp 7.

In the above manner, the two headlamps are thus gauged with respect to the vehicle itself and also with respect to each other, and it will be seen that such gauging is accomplished without regard to the level or non-level condition of the floor on which the vehicle is resting.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A method that uses two mutually transverse and frame-connected level indicators for gauging the position of the headlamps of a vehicle that consists in zeroizing said level indicators while the frame thereof is disposed on the same floor on which said vehicle is disposed, placing said frame against one of said headlamps and using the headlamp to locate the frame steadily on the axis of the beam of said headlamp and with one level indicator longitudinal to the length of the vehicle and the other transverse thereto, setting the transverse level indicator to zero by rotating the same relative to the headlamp, and noting the longitudinal level indicator to determine the variation from proper vertical alignment of the headlamp.

2. The method according to claim 1: then, after correcting any variation from the vertical in the position of said headlamp, sighting along a line parallel to the common plane of disposition of said headlamps to determine mutual parallelism of the two headlamps.

3. Apparatus for gauging the position of the headlamps of a vehicle that comprises a longitudinal frame provided with a transverse rim, said rim having an outer flange formed to fit over the encircling bezel of a headlamp to center thereon and to dispose the frame centered and aligned with the axis of the beam of the headlamp, and with foot rests adapting placing of said frame adjacent to and on the same surface on which a vehicle is disposed and the headlamps of which are to be gauged while the rim is disengaged from the headlamp bezel, said rim being transverse to the foot rests and in a vertical position when the frame is rested upon said surface, two horizontal level means carried by said frame, one parallel to the rim and the other transverse thereto, and means to adjust said level means independently.

4. Apparatus for gauging the position of the headlamps of a vehicle that comprises a longitudinal frame provided with a transverse rim, said rim having an outer flange formed to fit over the encircling bezel of a headlamp to center thereon and to dispose the frame centered and aligned with the axis of the beam of the headlamp, and with foot rests adapting placing of said frame adjacent to and on the same surface on which a vehicle is disposed and the headlamps of which are to be gauged while the rim is disengaged from the headlamp bezel, said rim being transverse to the foot rests and in a vertical position when the frame is rested upon said surface, two horizontal level means carried by said frame, one parallel to the rim and the other transverse thereto, means to adjust said level means independently, and a pair of aligned indicator members carried by said frame parallel to said rim and at the end of the frame remote from the rim.

5. Apparatus for gauging the position of the headlamps of a vehicle that comprises a longitudinal frame provided with a transverse rim, said rim having an outer flange formed to fit over the encircling bezel of a headlamp to center thereon and to dispose the frame centered and aligned with the axis of the beam of the headlamp, and with foot rests adapting placing of said frame adjacent to and on the same surface on which a vehicle is disposed and the headlamps of which are to be gauged while the rim is disengaged from the headlamp bezel, said rim being transverse to the foot rests and in a vertical position when the frame is rested upon said surface, two horizontal level means carried by said frame, one parallel to the rim and the other transverse thereto, means to adjust said level means independently, a pair of aligned indicator members carried by said frame parallel to said rim and at the end of the frame remote from the rim, said frame being adapted to be directed forwardly from a headlamp, a separate tool adapted to be disposed similarly in forwardly extending relation to the mate of the mentioned headlamp, and a target disc on the end of said tool and adapted to be sighted in line with said indicator members to determine the degree of mutual alignment of the two headlamps.

6. A headlamp gauging device comprising a longitudinal frame, two horizontal, mutually transverse and independently adjustable spirit levels carried by said frame, said frame being provided with a horizontal floor engageable bottom portion constituting support means when engaged with a floor to hold said levels horizontal, a bezel-engaging rim and formed to engage with and center on the bezel of a headlamp to locate the longitudinal frame on the axis of the beam of said headlamp and extending normal from one end of the bottom portion, and a pair of transversely aligned indicator members carried by the other end of said bottom portion and parallel to the plane of the rim.

References Cited in the file of this patent

UNITED STATES PATENTS

| | | |
|---|---|---|
| 1,743,546 | Hill | Jan. 14, 1930 |
| 2,111,580 | Arbuckle | Mar. 22, 1938 |
| 2,144,838 | Falge | Jan. 24, 1939 |
| 2,176,214 | Falge et al. | Oct. 17, 1939 |
| 2,292,969 | Peters | Aug. 11, 1942 |
| 2,337,502 | Scott et al. | Dec. 21, 1943 |
| 2,411,879 | Holmes | Dec. 3, 1946 |
| 2,557,893 | Russell et al. | June 19, 1951 |
| 2,570,458 | Kowalczyk | Oct. 9, 1951 |